United States Patent [19]

Irving

[11] Patent Number: 5,387,384
[45] Date of Patent: Feb. 7, 1995

[54] METHOD OF AND APPARATUS FOR MAKING CUSTOMIZED INSOLES FOR FOOTWEAR

[76] Inventor: Leslie F. Irving, 60, New Road, Bromsgrove, Worcestireshire B60 2TX, Great Britain

[21] Appl. No.: 875,833

[22] Filed: Apr. 30, 1992

[30] Foreign Application Priority Data

May 1, 1991 [GB] United Kingdom ............... 9109387

[51] Int. Cl.⁶ ........................................... B29C 33/40
[52] U.S. Cl. ............................... 264/138; 249/155; 264/223; 264/313; 425/2
[58] Field of Search ............ 425/2, 470; 264/222, 264/223, 313, 138, 161; 249/55, 155, 158, 161

[56] References Cited

U.S. PATENT DOCUMENTS

| | | | |
|---|---|---|---|
| 290,652 | 12/1883 | Stürmer | 264/223 |
| 881,912 | 3/1908 | Emrick | 249/155 |
| 1,458,847 | 6/1923 | Pipping | 249/158 |
| 2,216,533 | 10/1940 | Kaplan | 264/223 |
| 3,458,898 | 8/1969 | Casparis | 264/223 |
| 3,596,869 | 8/1971 | Humphrey | 249/155 |
| 4,450,122 | 5/1984 | Gallina | 264/223 |
| 4,470,782 | 9/1984 | Zimmerman, Jr. et al. | 425/2 |
| 4,603,024 | 7/1986 | Denis | 264/223 |
| 4,890,235 | 12/1989 | Reger et al. | 264/222 |
| 4,932,852 | 6/1990 | Suzuki | 425/2 |

FOREIGN PATENT DOCUMENTS

| | | | |
|---|---|---|---|
| 0026897 | 4/1981 | European Pat. Off. | |
| 761626 | 3/1934 | France | 264/222 |
| 1237688 | 6/1960 | France | 264/222 |
| 2560517 | 9/1985 | France | |
| 37437 | 3/1886 | Germany | 425/2 |
| 218426 | 3/1909 | Germany | 425/2 |
| 190837 | 7/1937 | Sweden | |
| 472414 | 9/1937 | United Kingdom | |
| 943586 | 12/1963 | United Kingdom | |
| 1269932 | 4/1972 | United Kingdom | |
| 1425312 | 2/1976 | United Kingdom | 249/155 |
| 1475405 | 6/1977 | United Kingdom | 264/223 |

Primary Examiner—Jay H. Woo
Assistant Examiner—Robert B. Davis

[57] ABSTRACT

A mold apparatus for use in manufacturing bespoke complementarily contoured cushion members such, for example, as cushion insole members for footware for subjects with foot deformities employs a large multiplicity of rods 15 supported at their ends by first and second flexible membranes 17, 19 formed from a medium viscosity silicone rubber. Under finger pressure applied at a surface say 19a of the membrane 19, the membrane 19 is locally deformed, the rods 15 sliding with respect to one another so as to produce complementary deformation at surface 17a of the other membrane 17. Clamp means 18 is operable by increasing friction between the rods 15 to prevent the rods from subsequent relative sliding movement.

Using the apparatus a bespoke cushioned insole for footwear may be produced to complementarily conform with the contoured surface 19a created by pressing the latter surface into intimate contact with a subject foot whilst the foot is in contact with the surface 17a.

13 Claims, 3 Drawing Sheets

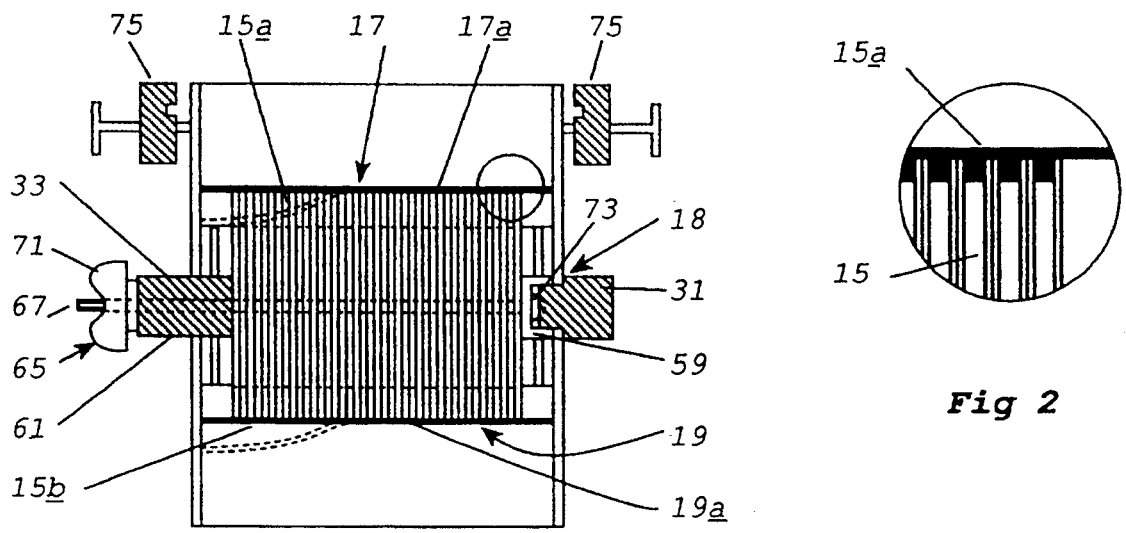
Fig 1
Fig 2
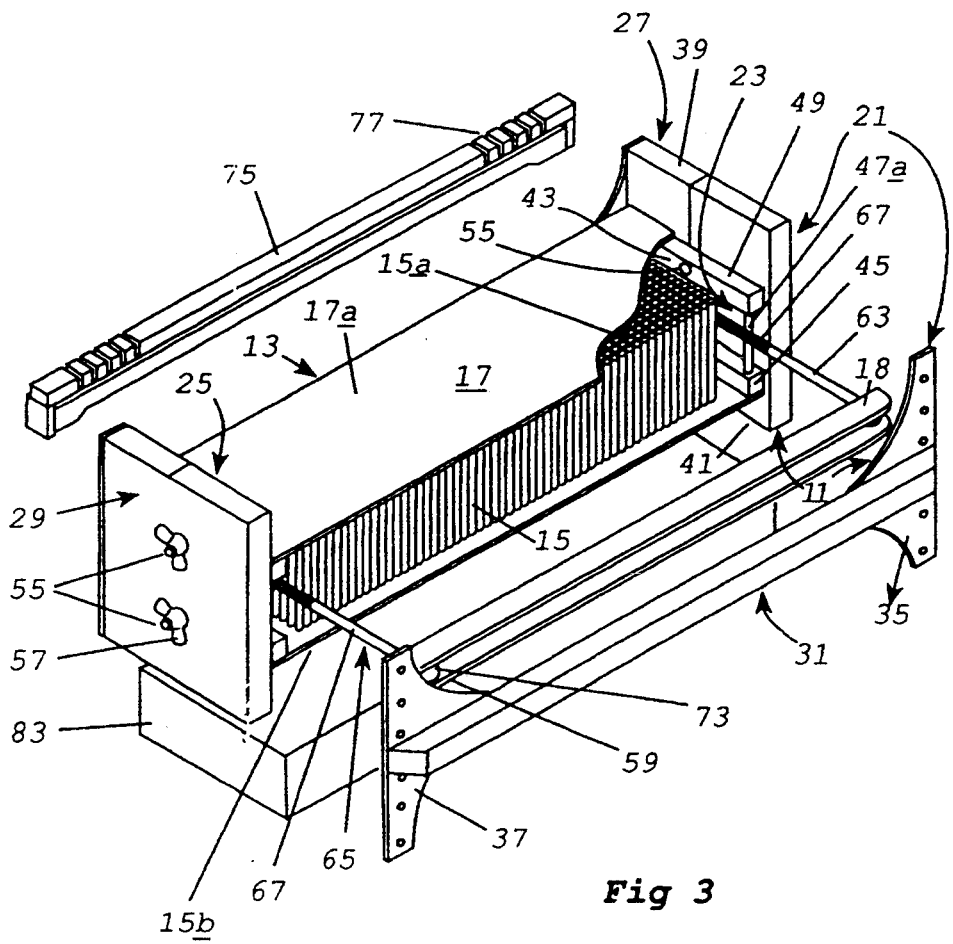
Fig 3

METHOD OF AND APPARATUS FOR MAKING CUSTOMIZED INSOLES FOR FOOTWEAR

BACKGROUND OF THE INVENTION

1. Field of the Invention

This invention relates to mold apparatus for use in the molding of customized cushion insoles for footwear, to a method of molding such insoles using such molds, and to customized cushion insoles formed using the apparatus and method.

2. Description of Prior Art

Where, as with subjects with foot deformities arising, for examples, from arthritic or diabetic conditions in the subject, customized cushion insoles are required, it is customary to make an insole for the subject using a plaster slipper on the foot, the slipper being made using a plaster bandage to form a negative mold; filling the negative mold with plaster which, when set and removed from the negative mold, gives a positive mold to the shape of the foot. An insole may, thereafter, be manufactured from any one of a variety of methods using the mold.

All such methods suffer from the following disadvantages:

(a) it is necessary to make both positive and negative molds;

an alteration to be made to an insole, for example, to relieve a pressure spot discovered after manufacture using the positive mold, must be made to the positive mold and a modified insole east therein. The success of producing a positive mold with a view to producing an insole comfortable to the wearer cannot be assured, it can be determined only by the subject for whom the insole has been prepared; the process of altering the positive mold may have to be repeated before success in relieving the discomfort of a pressure spot is achieved;

(c) plaster, by its very nature, is messy to use, requires a water supply and suitable environmental conditions and facilities, generally a special room at a hospital or clinic;

(d) the production of molds, both positive and negative, and the frequently arising requirement for modification of the positive mold to arrive at an insole satisfactory to the wearer render the process costly both as regards the facilities to be provided and as regards time spent by highly skilled personnel in the performance of the process ending with the fitting to the footwear of insoles comfortable and beneficial to the wearer.

Notwithstanding the disadvantages mentioned, procedures of the sort touched on continue as the generally accepted common practice around the world.

Mold apparatuses have been proposed which are reliant upon relative longitudinal movement between a plurality of rod elements to form a casting mold in the form of a contour which is complementary to a pattern (in some instances a human foot). Other known arrangements proposed rely on relative movement between the particles of a particulate mass. Still others rely on the formation of a depression in a suitable highly viscous fluid. Some of the prior arrangements have employed a flexible membrane as a boundary surface of the mold; others have left the mold formable body, e.g. plurality of longitudinally relatively moveable rod elements exposed.

Certain of the prior arrangements have application as a customized last or pattern from which footwear may be produced; but none of the known arrangements is suitable in the cost-effective production of customized insoles for footwear, particularly, though not exclusively, orthopaedic footwear.

SUMMARY Of THE INVENTION

The invention is concerned with a mold apparatus and its method of use in the production of customized cushion insoles for footwear.

According to one aspect of the invention, a mold apparatus comprises: a mold carrier having a longitudinal direction, a direction of width, and a direction of depth and having first and second portions which are spaced apart in said longitudinal direction and which extend widthwise parallel to one another, and third and fourth portions which, also, are spaced apart in said longitudinal direction to extend widthwise parallel to one another with said first widthwise portion above said third widthwise portion and said second widthwise portion above said fourth widthwise portion; first and second membranes each having a longitudinal direction and a direction of width and having first and second marginal fixing portions at the longitudinal extremities, respectively, thereof; first, second, third and fourth securing means, the first securing said first spaced marginal portion of the first membrane along the length of the first widthwise extending portion, the second securing the second marginal portion of the first membrane along the length of the second widthwise extending portion, the third securing the first marginal portion of the second membrane along the third widthwise extending portion, and the fourth securing the second marginal portion of the second membrane along the fourth widthwise extending portion; between said membranes, a plurality of rod elements packed side by side in frictional contact with one another and each with one end thereof fixed with respect to the first membrane and the other fixed with respect to the second membrane; and in which the membranes are of such composition as to be suceptible to local deformation under manual pressure applied thereto, manual local deformations produced in one membrane giving rise to complementary local deformations in the other membrane through the agency of longitudinal movement against friction in rod elements extending between the membranes and effected by deformations produced in said one membrane; and the frictional resistance between rod elements maintains a deformation of the membranes by preventing relative longitudinal motion.

According to another aspect of the invention, a method of manufacturing a customized contoured insole for footwear using a mold apparatus comprising a plurality of parallel rod elements the ends of each of which are respectively connected to first and second flexible membranes, the rod elements extending between said membranes parallel to one another in frictional contact with one another, and the membranes are supported along opposite marginal portions thereof by peripheral supporting means, comprising the steps of:

(a) initially realigning the rod elements to flatten the first and second membranes;

(b) placing above one of the membranes a template having an aperture having the shape and size of the planter surface of a subject foot;

(c) marking the outline of the template aperture in the membrane surface below the template and thereafter removing the template;

(d) bringing the outlined surface of said one membrane and the plantar surface of the subject foot to contact;

(e) applying pressure to the membrane with the plantar foot surface to produce a depression in the surface of the outlined membrane wherein the rod elements produce a positive shape of the plantar foot surface in the opposite membrane surface;

(f) clamping the rod elements to maintain the shape caused by the impression;

(g) placing the mold such that the surface of said other membrane is upright;

(h) placing the template above said other membrane surface such that the outlines of the template aperture and the positive form created in said other membrane are in registration;

(i) applying limp sheet material over the template;

(j) deforming the sheet material throughout an area corresponding to the outline of the template such that a cashing mold is formed having a bottom surface corresponding to the positive shape of the membrane surface and peripheral walls corresponding to the outline of the template aperture;

(k) placing a flexible sheet material into the casting mold such that the flexible sheet material is pressed against the contour of the of the membrane having the positive shape and a portion of the side wall of the casting mold;

(l) pouring a settable cushion-forming material into the casting mold wherein the cushion-forming material bonds to the flexible sheet material upon setting;

(m) setting the cushion-forming material so as to form the insole albeit in an untrimmed condition;

(n) removing the untrimmed insole from the casting mold; and, (o) trimming the insole to form an outline conforming to the aperture in the template.

According to another aspect of the invention, a method of manufacturing a customized contoured cushion insole for footwear using a mold apparatus comprising: a mold carrier having a longitudinal direction, a direction of width, and a direction of depth and having first and second portions which are spaced apart in said longitudinal direction and which extend widthwise parallel to one another, and third and fourth portions which, also, are spaced apart in said longitudinal direction to extend widthwise parallel to one another with said first widthwise portion above said third widthwise portion and said second widthwise portion above said fourth widthwise portion; first and second membranes each having a longitudinal direction and a direction of width and having first and second marginal fixing portions at the longitudinal extremities, respectively, thereof; first, second, third and fourth securing means, the first securing said first spaced marginal portion of the first membrane along the length of the first widthwise exending portion, the second securing the second marginal portion of the first membrane along the length of the second widthwise extending portion, the third securing the first marginal portion of the second membrane along the third widthwise extending portion, and the fourth securing the second marginal portion of the second membrane along the fourth widthwise extending portion; between said membranes, a plurality of rod elements packed side by side in frictional contact with one another and each with one end thereof fixed with respect to the first membrane and the other fixed with respect to the second membrane; and in which the membranes are of such composition as to be suceptible to local deformation under manual pressure applied thereto, manual local deformations produced in one membrane giving rise to complementary local deformations in the other membrane through the agency of longitudinal movement against friction in rod elements extending between the membranes and effected by deformations produced in said one membrane; and the frictional resistance between rod elements against longitudinal relative motion thereof is such as, after deformation of the membranes as aforesaid, to maintain such deformation, the method comprising:

(a) initially realigning the rod elements to flatten the first and second membranes;

(b) placing above one of the membranes a template having an aperture of substantially the same shape and size of the plantar surface of a subject foot, the template being orientated such that the aperture has its direction of length substantially parallel to the longitudinal direction of said one membrane;

(c) marking an outline of the template aperture in the membrane surface below the template and thereafter removing the template;

(d) bringing the outlined surface of the one membrane and the plantar surface of the subject foot to contact with one another;

(e) applying manual, e.g. finger, pressure from position to position over the surface of the other membrane against the reaction of the plantar foot surface in contact with the one membrane so as to form in the surface of said one membrane a negative form of said plantar foot surface and in said other membrane a positive form of said plantar surface;

(f) clamping the rod elements to maintain the shape created in the membrane;

(g) placing the mold such that the surface of said other membrane is upright;

(h) placing the template above said other membrane surface such that the outlines of the template aperture and the positive form created in said other membrane are in registration;

(i) applying limp sheet material over the template so placed;

(j) deforming the sheet material throughout an area corresponding to the outline of the template aperture such that a casting mold is formed having a bottom surface corresponding to the positive form of the membrane surface and peripheral walls corresponding to the outline of the template aperture;

(k) placing a flexible sheet material into the casting mold such that the flexible sheet material is pressed against the contour of the membrane having the positive form and a portion of the side wall of the casting mold;

(l) pouring a settable cushion-forming material into the casting mold wherein the cushion-forming material bonds to the flexible sheet material upon setting;

(m) setting the cushion-forming material so as to form the insole albeit in an untrimmed condition;

(n) removing the untrimmed insole from the casting mold; and, (o) trimming the insole to form an outline conforming to the aperture in the template.

The efficacy of the above-stated method of manufacturing a customized cushion insole relies, to a large extent on the character of the mold apparatus employed, that is to say a mold apparatus in which the rod elements have their ends respectively fixed with respect to first and second flexible membranes, suitably an elastomer, and with the membranes fixed, as stated, to the carrier only at the longitudinal extremities of the membranes.

BRIEF DESCRIPTION Of THE DRAWINGS

A mold apparatus, a method of using the mold apparatus in the production of a customized cushion insole, and an insole produced using the method, are hereinafter described with reference to the accompanying drawings, in which:

FIG. 1 is a partially exploded pictorial diagram of the mold apparatus;

FIG. 2 is a pictorial part broken away diagram of the mold apparatus of FIG. 1;

FIG. 3 is a further pictorial diagram of said mold element of FIG. 1;

Figure 4:
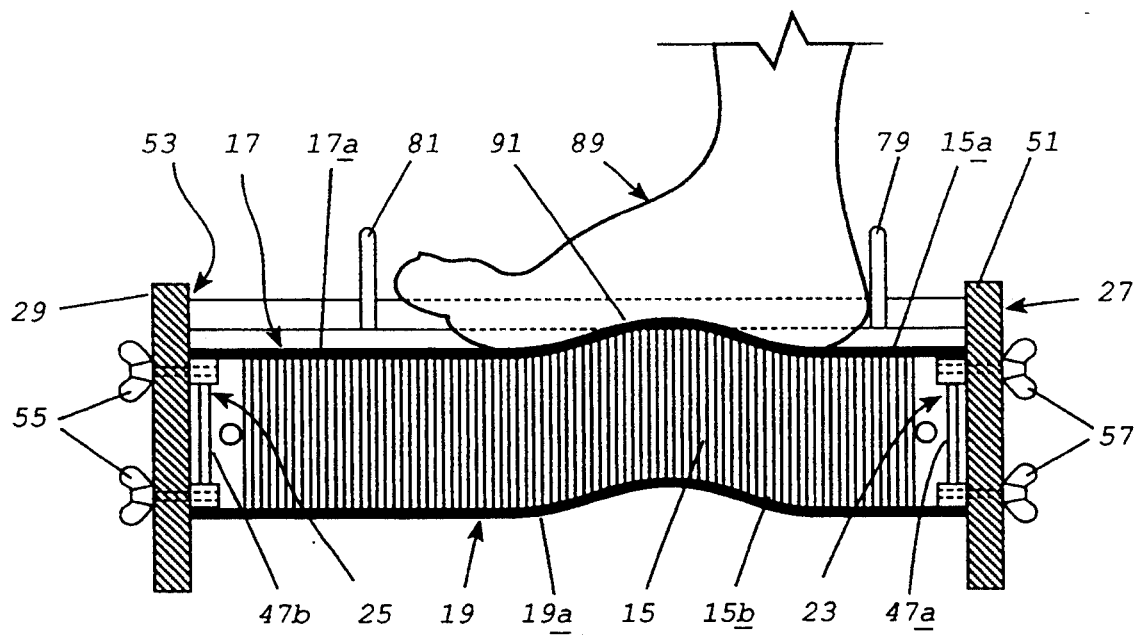
FIG. 4 depicts a longitudinal section through the mold element of FIG. 1.
Figure 5:
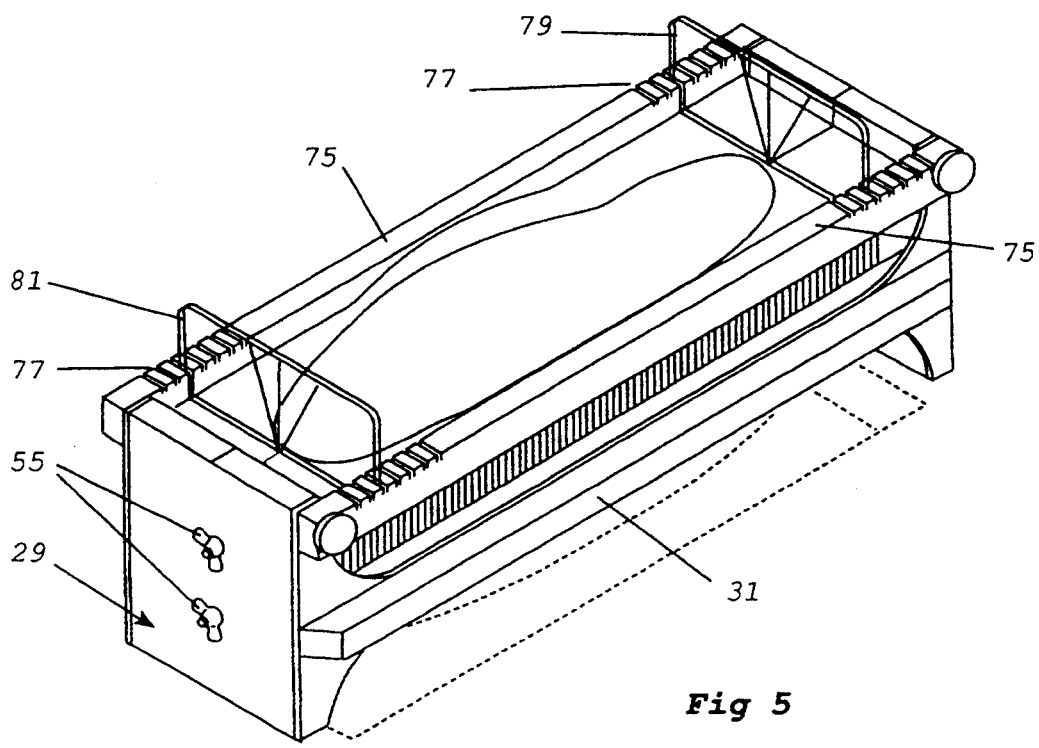
FIG. 5 shows a cross-section through the mold element of FIG. 1.
Figure 6:
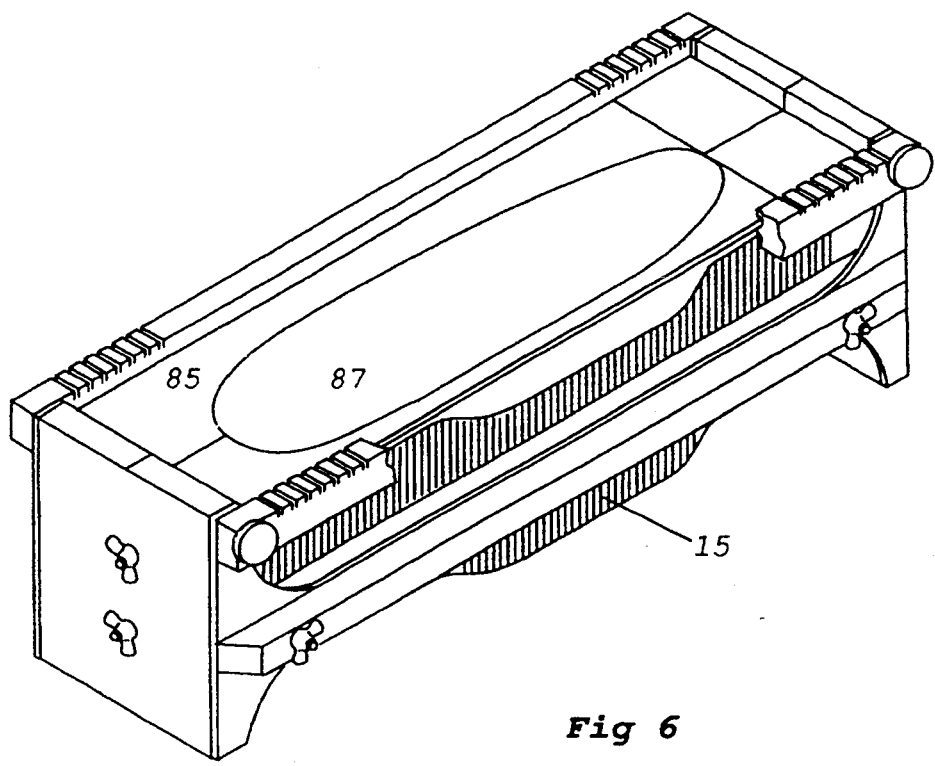
FIG. 6 is a scrap diagram of a principal feature of the mold element.
Figure 7:
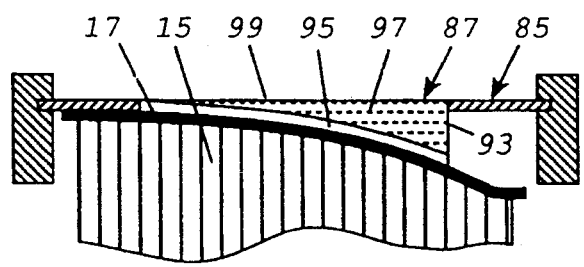
FIG. 7 shows, pictorially, a cross-section through part of the mold apparatus in the course of use thereof in the production of an insole; and, FIG. 8 is a pictorial representation of an insole produced using the apparatus.
Figure 8:
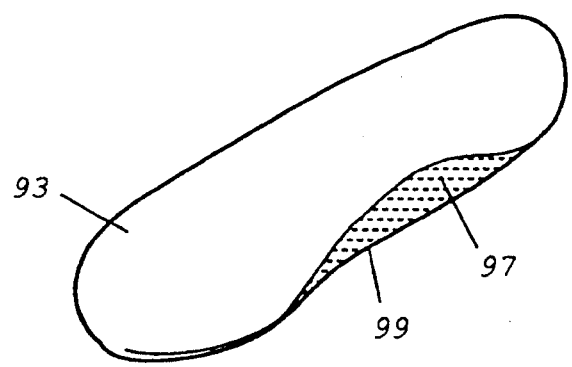

The mold apparatus has: a mold carrier 11 and a mold part 13.

The mold part 13 itself comprises: a large multiplicity of rod elements 15; means supporting the said elements 15 parallel to one another in a pack whilst permitting differential longitudinal movement therebetween against frictional resistance; first and second flexible membranes 17, 19, which are in respective engagement with, collectively, corresponding end portions 15a, 15b, respectively, of the elements 15.

The membranes 17, 19, have smooth outwardly-facing surfaces 17a, 19a, respectively, and are of such composition, being, typically, of a medium viscosity silicone rubber which, in the cured state has a shore hardness of about 30, as to be susceptible to local deformation under manual, e.g. finger, pressure applied at a said smooth membrane surface 17a, 19a.

The parallel rod elements 15 are operative upon local deformation, as aforesaid of said membrane, to transmit such deformation by differential longitudinal movement as aforesaid, therebetween, so as to produce corresponding though complementary local deformation in the other said membrane.

The aforesaid frictional resistance is such as to resist thereafter unwanted change in local deformation produced in the membranes, the mold element adopting a state or configuration which is stable under applied forces of magnitude less than the friction force opposing relative movement of the elements 15.

Considering the embodiment in somewhat greater detail, said membranes 17, 19, are respectively constituted as first and second matrixes, which respectively bind together said corresponding end portions 15a, 15b, of the elements 15 and which, additionally, constitute said means supporting the latter elements parallel to one another in a pack.

The rod elements 15 are close-packed, frictional resistance therebetween arising as a result of lengthwise frictional contact between the elements.

In the embodiment, the elements 15 are plastic cylindrical tubular elements each 75 mm in length and 3 mm in diameter.

The mold carrier 11 comprises: a rigid frame part 21 and first and second parallel motion devices 23, 25, respectively.

The rigid frame part has first and second end walls 27, 29, respectively, held apart in fixed relationship to one another by rigid beam members 31, 33, respectively. The beam members 31, 33, each have end flange portions, as 35, 37, respectively, which are secured to the end walls 27, 29, the beam members 31, 33, extending between the end walls 27, 29, at positions intermediate the upper and lower edges 39, 41, thereof.

The parallel motion devices 23, 25, are independently angularly adjustable, each device comprising upper and lower bar elements, as 43, 45, respectively, and first and second wire elements, as 47a, 47b, respectively connected at their extremities to the rigid bar elements 43, 45, at spaced apart positions, as 49, therealong, said connections being such as to constrain the devices 23, 25, to behave as parallel motion devices. The connections, as at 49, may be by pure pivotal motion between the elements 47a, 47b, and the rigid bar elements 43, 45; or the wire elements, as in the embodiment depicted, may be secured at their extremities to said bar elements, parallel motion then relying on the natural resiliently bendable characteristic of the wire elements, the angular deflections encountered in practice being relatively small.

The parallel motion devices are respectively located adjacent to the opposed facing surfaces 51, 53, respectively, of the end walls 27, 29, being respectively connected to said walls by screws 55 which extend through aligned holes through the centroids of the bar elements 43, 45, and through the end walls 27, 29, and wing nuts 57 which, threaded on said screws 55 from the outer ends thereof are operable to clamp the parallel motion devices in any desired angular position within a certain range.

The aforesaid marginal portions of said membranes are respectively at two opposite edges of each membrane. The marginal portions of the first membrane 17 are respectively secured to the rigid bar elements 43, 45, of the one parallel motion device 23, and the marginal portions of the other membrane 19 are respectively secured to the rigid bar elements (not shown) of the other parallel motion device 25.

The mold apparatus has clamp means 18 for securing the membranes 17, 19, against change of contour regardless of the angular positions to which the parallel motion devices may have been set with respect to one another.

The clamp means comprises first and second rigid channel section strap members 59, 61, respectively, and first and second operating devices 63, 65, respectively.

The strap members 59, 61, respectively extend at opposite sides of the mold carrier 11 lengthwise thereof between the variable motion devices 23, 25. The operating devices 63, 65, comprise first and second bolts 67 and wing nuts, as 71. The heads, as 73, of the bolts 67 are received within the channel of one strap 59 and the shanks of the bolts extend through aligned apertures in the other strap 61 and beam 31. The wing nuts 71 threadingly engage the bolts to cramp the rod elements between the strap members 59, 61.

First and second lateral rails 75 extend lengthwise of the mold carrier 11 between the end walls 27, 29, at opposite corners thereof. The rails 75 have slots 77 therein at intervals therealong, said slots being adapted to receive a heel stop plate 79 and a spacer plate 81.

As a preliminary to use of the mold it is often necessary to ensure that the outwardly facing smooth surfaces 17a, 19a, are flat.

To this end, a rigid body in the form of block 83 of rectangular cross-section and membrane 19 are brought to contact. The block 83 has a length somewhat less than the spacing between the opposed end wall surfaces 51, 53, and a thickness somewhat greater than the distance between the bottom edges 85 of the end walls outwardly facing smooth surface of the membrane 19 with the latter extending transversely of the end walls. With the block 83 laid against a stable reaction part, a table for example, the mold carrier 11 is applied with the membrane surface in contact with the upper flat surface of the block 83. The membrane 19 is then rendered with its smooth outwards surface to a flat condition either by finger pressure or by the action of a roller thereover.

The mold apparatus being so conditioned, the apparatus is ready for use in the manufacture of a customized contoured cushion insole.

A description of a preferred method of using the apparatus for such a purpose is next described.

For reasons of hygiene, a plastic cover (not shown) being a body of thin limp sheet material, e.g. cling film, is laid over the outwards surface 17a of the membrane 17. A template 85 having an aperture 87, to the size of the subject foot 89, is laid over the flat protective cover over the membrane 17. The outline of the aperture is then marked through onto the protective cover. The template 85 is then removed and the heel and toes stop plates 79, 81, are inserted with lower lateral marginal portions thereof in a pair of aligned slots 77 in the side rails 75, so as to align with the heel and toe extremities at the aperture 87 marked onto the protective cover.

The subject foot is next brought with its plantar surface 91 to contact with the membrane surface 17a, within the confines of the heel and toe stop plates 79, 81, and within the area previously marked onto the protective cover from the template 85. Using the fingers, pressure is next applied locally across and along the membrane surface 19a in the area thereof corresponding to the position of the aperture 87 of the rigid template at the membrane 17. In so doing, rod elements 15 are displaced with respect to one another under local deformation of the membrane 19. Such displacement of membrane surface 19a and the consequent displacement of elements 15 is determined locally by intimate contact between the membrane surface 17a and the plantar surface 91. At completion of this stage of the method, the membrane surfaces 17a, 19a, of the mold part 15 each have a surface contour, the one at the surface 17a being a substantially accurate negative of the plantar surface 91 and the other, at surface19a being a correspondingly accurate positive of said plantar surface 91, that is to say, is an accurate representation of the foot surface to be matched by the insole to be produced.

The clamp means 18 is next operated, the strap members cramping the rod elements 15 firmly together thus preventing relative movement therebetween.

The heel and toe spacer plates 79, 81, having been removed, the template 85 is next applied over the membrane surface 19a, with its aperture at the position exactly corresponding to that previously assumed by the template when in contact with the surface 17a. In so applying the template 85 to the surface 19a, the surface of the template which at the membrane 17a was outwards facing is, of course, employed at the membrane 19a as the inwards facing template surface.

With the template 85 accurately so registered, marginal template surfaces, extending from the aperture edge to the membrane surface are greased. A sheet of cling film 93 is then laid applied over the template 85 and molded into the aperture 87 so as to make intimate contact with the contoured exposed membrane surface 19a thereby forming side walls to the enclosure formed by the aperture 87 and the membrane 19a, the grease film thereover assisting in the adhesion of the cling film 93. The outwards facing surface of the so-adherent cling film is next greased and a body of shock absorbing foam rubber material 95, Cleron (Registered Trade Mark) say, or PPT, and approximately to the foot size, is next laid over the cling film to cover the area of the membrane surface 19a exposed by the template aperture 87.

As a result of the foregoing, the upwards facing surface of the body 95, the cling film drawn upwardly therearound, and the template upper surface extending from the edge od its aperture 87 define a well 97 which is substantially a match with the plantar surface of the subject foot.

The well 97 is next filled with a quick-setting, pourable, self-levelling silicone rubber, being a rubber making good adhesion with the body 95. Typically, the silicone rubber is a low viscosity rubber settable in about 3 minutes and which, when set, has a shore hardness of about 30.

A backing member 99 adapted to make contact with the inner surface of the sole portion of the footwear is applied to the upper surface of the poured silicone rubber before it has set. The backing member 99 may be of cork, it may be of a silicone, a natural or a foam rubber. It may be of any other suitable material, all possessing good adhesive properties with the set, poured silicone rubber.

After the poured silicone rubber shall have set, the composite body to provide the insole is removed from the well 97 throught the aperture 87 of the template85.

It should be appreciated that the subject foot may deviate angularly from the physiologically normal orthopaedic state, due to arthritic or other condition; it is to accommodate such conditions that the mold part is slung, as previously described, between the two independently adjustable parallel motion devices 23. By appropriate adjustment of the two devices 23 or either of them as the case may require, a wide range of orthopaedic abnormalities of the kind referred to may be catered for.

In the embodiment described with reference to the accompanying drawings, the rod elements 15 are all cylindrical plastic tubes. It may, however, be preferable to employ metal cylindrical tubular elements at the periphery, such tubes having greater mechanical strength khan the plastic tubes which are surrounded thereby. The presence of a jacket of such metal tubes serves to protect the interiorly situate plastic tubes against mechanical damage.

I claim:

1. A method of manufacturing a customized contoured insole for footwear using a mold apparatus comprising a plurality of parallel rod elements the ends of each of which are respectively connected to first and second flexible membranes, the rod elements extending between said membranes parallel to one another in frictional contact with one another, and the membranes are supported along opposite marginal portions thereof by peripheral supporting means, comprising the steps of:

(a) initially realigning the rod elements to flatten the first and second membranes;
(b) placing above one of the membranes a template having an aperture having the shape and size of the plantar surface of a subject foot;
(c) marking the outline of the template aperture in the membrane surface below the template and thereafter removing the template;
(d) bringing the outlined surface of said one membrane and the plantar surface of the subject foot to contact;
(e) applying pressure to the membrane with the plantar foot surface to produce a depression in the surface of the outlined membrane wherein the rod elements produce a positive shape of the plantar foot surface in the opposite membrane surface;
(f) clamping the rod elements to maintain the shape caused by the impression;
(g) placing the mold such that the surface of said other membrane is upright;
(h) placing the template above said other membrane surface such that the outlines of the template aperture and the positive form created in said other membrane are in registration;
(i) applying limp sheet material over the template;
(j) deforming the sheet material throughout an area corresponding to the outline of the template such that a casting mold is formed having a bottom surface corresponding to the positive shape of the membrane surface and peripheral walls corresponding to the outline of the template aperture;
(k) placing a flexible sheet material into the casting mold such that the flexible sheet material is pressed against the contour of the membrane having the positive shape and a portion of the side wall of the casting mold;
(l) pouring a settable cushion-forming material into the casting mold wherein the cushion-forming material bonds to the flexible sheet material upon setting;
(m) setting the cushion-forming material so as to form the insole albeit in an untrimmed condition;
(n) removing the untrimmed insole from the casting mold; and,
(o) trimming the insole to form an outline conforming to the aperture in the template.

2. A mold apparatus which comprises: a mold carrier having a longitudinal direction, a direction of width, and a direction of depth and having first and second portions which are spaced apart in said longitudinal direction and which extend widthwise parallel to one another, and third and fourth portions which, also, are spaced apart in said longitudinal direction to extend widthwise parallel to one another with said first widthwise portion above said third widthwise portion and said second widthwise portion above said fourth widthwise portion; first and second membranes of a composition which is deformable under manual pressure; each having a longitudinal direction and a direction of width and having first and second marginal fixing portions at the longitudinal extremities, respectively, thereof; first, second, third and fourth securing means, the first securing said first spaced marginal portion of the first membrane along the length of the first widthwise exending portion of the mold carrier, the second securing the second marginal portion of the first membrane along the length of the second widthwise extending portion of the mold carrier, the third securing the first marginal portion of the second membrane along the third widthwise extending portion of the mold carrier, and the fourth securing the second marginal portion of the second membrane along the fourth widthwise extending portion of the mold carrier; between said membranes, a plurality of rod elements packed side by side in frictional contact with one another and each with one end thereof fixed with respect to the first membrane and the other fixed with respect to the second membrane; and in which manual local deformations produced in one membrane give rise to complementary local deformations in the other membrane through the agency of longitudinal movement against friction in rod elements extending between the membranes and effected by deformations produced in said one membrane; and in which frictional resistance between rod elements maintains a deformation of the membranes by preventing relative longitudinal motion.

3. A mold apparatus as claime in claim 2 in which: the membranes are respectively constituted as first and second matrixes of elastomeric material which respectively bind together corresponding end portions of the rod elements.

4. A mold apparaus as claimed in claim 3 in which: the mold carrier comprises a rigid frame part having opposed first and second end walls spaced apart in said longitudinal direction; and first and second parallel motion devices respectively associated with said first and second end walls and each having first and second rigid members constituting, in the one case, said first and second widthwise extending portions and, in the other, said third and fourth widthwise extending portions, each said rigid member being pivotally connected at positions intermediate the ends thereof; and in each said device, between said first and second rigid members thereof, means constraining said rigid members to maintain parallelism with respect to each other whilst permitting relative angular displacement between the parallel rigid members of the first device with respect to the second.

5. A mold apparatus as claimed in claim 2 in which: in each said parallel motion device the means constraining the widthwise extending rigid members to maintain parallelism comprises: first and second resiliently flexible wire elements which extend between and are connected at their ends to said rigid members at positions spaced apart therealong.

6. A mold apparatus as claimed in claim 5 and which has clamp means operable to exert an inwards pressure on the rod elements disposed side by side along the longitudinal boundaries of the membranes, thereby to increase the friction between the rod elements.

7. A mold apparatus as claimed in claim 6 in which: said clamp means comprises: first and second rigid strap members extending lengthwise between the parallel motion devices so as respectively to span opposite sides of the pack of rod elements; and, first and second operating devices which incorporate elements respectively extending transversely of said strap members at or adjacent to opposite ends thereof and which, said operating devices being actuated, the strap members respectively bear against said opposite sides of said pack, cramping together rod elements.

8. A mold apparatus as claimed in claim 7 which has: first and second lateral guide rails extending lengthwise of the frame part; and at least one member adapted to the guide rails so as to span the gap therebetween at substantially any position therealong.

9. A mold apparatus as claimed in claim 8 in which: said lateral guide rails have correspondingly positioned slots at intervals therealong; and said at least one member comprises a body of sheet material lateral portions of which are locatable in any such correspondingly positioned slots and the height of which is such that the sheet material body is upstanding above the level of the guide rails.

10. A mold apparatus as claimed in claim 6 in which the rod elements are tubular.

11. A mold apparatus as claimed in claim 10 in which all but the tubular elements at the boundary of said plurality of rod elements are of a plastic material.

12. A mold apparatus as claimed in claim 11 in which the tubular elements around the boundary of said plurality of said rod elements are of metal.

13. A method of manufacturing a customized contoured cushion insole for footwear using a mold apparatus comprising: a mold carrier having a longitudinal direction, a direction of width, and a direction of depth and having first and second portions which are spaced apart in said longitudinal direction and which extend widthwise parallel to one another, and third and fourth portions which, also, are spaced apart in said longitudinal direction to extend widthwise parallel to one another with said first widthwise portion above said third widthwise portion and said second widthwise portion above said fourth widthwise portion; first and second membranes each having a longitudinal direction and a direction of width and having first and second marginal fixing portions at the longitudinal extremities, respectively, thereof; first, second, third and fourth securing means, the first securing said first spaced marginal portion of the first membrane along the length of the first widthwise exending portion, the second securing the second marginal portion of the first membrane along the length of the second widthwise extending portion, the third securing the first marginal portion of the second membrane along the third widthwise extending portion, and the fourth securing the second marginal portion of the second membrane along the fourth widthwise extending portion; between said membranes, a plurality of rod elements packed side by side in frictional contact with one another and each with one end thereof fixed with respect to the first membrane and the other fixed with respect to the second membrane; and in which: the membranes are of such composition as to be suceptible to local deformation under manual pressure applied thereto, manual local deformations produced in one membrane giving rise to complementary local deformations in the other membrane through the agency of longitudinal movement against friction in rod elements extending between the membranes and effected by deformations produced in said one membrane; and the frictional resistance between rod elements against longitudinal relative motion thereof is such as, after deformation of the membranes as aforesaid, to maintain such deformation, the method comprising:

(a) initially realigning the rod elements to flatten the first and second membranes;

(b) placing above one of the membranes a template having an aperture of substantially the same shape and size of the plantar surface of a subject foot, the template being orientated such that the aperture has its direction of length substantially parallel to the longitudinal direction of said one membrane;

(c) marking an outline of the template aperture in the membrane surface below the template and thereafter removing the template;

(d) bringing the outlined surface of the one membrane and the plantar surface of the subject foot to contact with one another;

(e) applying manual pressure from position to position over the surface of the other membrane against the reaction of the plantar foot surface in contact with the one membrane, so as, as a result of longitudinal sliding movement against friction therebetween, to form in the surface of said one membrane a negative form of said plantar foot surface and in said other membrane a positive form of said plantar surface;

(f) clamping the rod elements to maintain the shape created in the membrane;

(g) placing the mold such that the surface of said other membrane is upright;

(h) placing the template above said other membrane surface such that the outlines of the template aperture and the positive form created in said other membrane are in registration;

(i) applying limp sheet material over the template so placed;

(j) deforming the sheet material throughout an area corresponding to the outline of the template aperture such that a casting mold is formed having a bottom surface corresponding to the positive form of the membrane surface and peripheral walls corresponding to the outline of the template aperture;

(k) placing a flexible sheet material into the casting mold such that the flexible sheet material is pressed against the contour of the membrane having the positive form and a portion of the side wall of the casting mold;

(l) pouring a settable cushion-forming material into the casting mold wherein the cushion-forming material bonds to the flexible sheet material upon setting;

(m) setting the cushion-forming material so as to form the insole albeit in an untrimmed condition;

(n) removing the untrimmed insole from the casting mold; and, (o) trimming the insole to form an outline conforming to the aperture in the template.

* * * * *